United States Patent [19]

Meyer

[11] 4,011,635
[45] Mar. 15, 1977

[54] RETAINER CLIP

[75] Inventor: Engelbert Anthony Meyer, Bloomfield Hills, MI

[73] Assignee: USM Corporation, Boston, Mass.

[22] Filed: Nov. 26, 1975

[21] Appl. No.: 635,677

[52] U.S. Cl. .............................. 24/73 MF; 52/718
[51] Int. Cl.² ................ A44B 21/00; E04F 19/02
[58] Field of Search ....... 24/73 FT, 73 MF, 73 PM, 24/73 SC, 259 PW, 259 TF; 52/717, 718

[56] References Cited
UNITED STATES PATENTS

| | | | |
|---|---|---|---|
| 2,644,213 | 7/1953 | Bedford, Jr. | 24/73 MF |
| 2,681,716 | 6/1954 | Black | 52/718 |
| 3,239,988 | 3/1966 | Meyer | 52/718 |
| 3,445,979 | 5/1969 | Meyer | 52/718 |

Primary Examiner—Paul R. Gilliam
Assistant Examiner—Kenneth J. Dorner
Attorney, Agent, or Firm—Aubrey C. Brine; Richard B. Megley; Vincent A. White

[57] ABSTRACT

A one-piece clip is provided for attaching a trim strip molding and an underlying elongated flat strip of flexible material having a beaded edge onto a panel having a button headed stud protruding therefrom. The clip and beaded strip are attached to the stud and the trim strip attached to the clip. The clip comprises means for orienting the flexible strip relative to the stud, and the trim strip relative to the stud whereby the assembled trim strip and flexible strip are retained onto the panel in desired alignment.

12 Claims, 5 Drawing Figures

RETAINER CLIP

BACKGROUND OF THE INVENTION

The present invention relates to clips for retaining ornamental molding onto a panel, and more particularly to a clip for retaining a U-shaped trim molding strip onto a panel by employing button headed studs wherein an elongated strip having a beaded edge is employed in the assembly.

For a number of years it has been customary practice in the design and manufacture of automobiles to employ strips of chrome or other ornamental material to enhance the appearance of the automobile body. In more recent years, the trim strips of molding have been advantageously fastened to the body panels by employing studs having button heads and a clip which serves to interconnect the trim molding to the stud, the studs being welded in a prescribed pattern to which the molding is to conform.

In more recent years, the use of vinyl material for covering the outer surface of an automobile top has become quite popular. Generally, the transition from the metal body panel to the vinyl material is provided with a U-shaped trim molding member for purposes of appearance and to cover the often uneven edges of the vinyl material. In finishing this assembly, an elongated strip of flexible vinyl is generally assembled with the chrome strip to complete the transition from the metal structure to the flexible vinyl sheet material.

In construction of this assembly, one of the problems encountered is that of locating the various elements relative to one another for ease of assembly. In assembling the various components which provide the finishing edge of the vinyl roof material, the flexible vinyl strip sometimes called lace, is provided with slots or holes so that it is received over the button-headed studs. The flexible strip, which has a great variance over its length with regard to the location of the beaded edge relative to the stud, must be centered relative to the stud if it is to receive the U-shaped trim molding subsequent to the fastener clip fixing it against the underlying structure. Also, the metallic trim molding strip is fairly rigid over the length from one fastener to another, and therefore must be attached to each of the button studs by means which allow slight linear deviation between the line of studs and the linearity of the trim molding strip.

It is, therefore, an object of the present invention to provide a clip for assemblying a U-shaped trim molding onto a panel having a plurality of button headed studs which serves to orient the strip of vinyl material and the trim molding relative to the stud, and relative to one another.

A further object of the invention is to provide a unitary clip of the type described, which is simple to manufacture, and facilitates assembly of a U-shaped trim molding and flexible elongated strip onto a body panel.

SUMMARY OF THE INVENTION

The above objects of the invention are achieved by providing a one-piece resilient metal clip for assembling U-shaped trim molding and an elongated flexible strip onto a panel surface by means of button headed stud fasteners wherein the clip has a body portion comprising means for extending contiguous with the edges of the strip to center the body portion on the strip and resilient means for engaging the button head of the stud fastener to retain the clip and the strip adjacent the surface having the studs provided thereon. The body portion of the clip is further provided with means for engaging the molding which extend into the U-shaped trim molding and serve to retain and align the molding relative to the flat strip.

BRIEF DESCRIPTION OF THE DRAWING

The foregoing and other features of the invention will now be described in connection with an illustrative embodiment, and with reference to the accompanying drawing wherein.

DESCRIPTION OF THE PREFERRED EMBODIMENT

Figure 1:
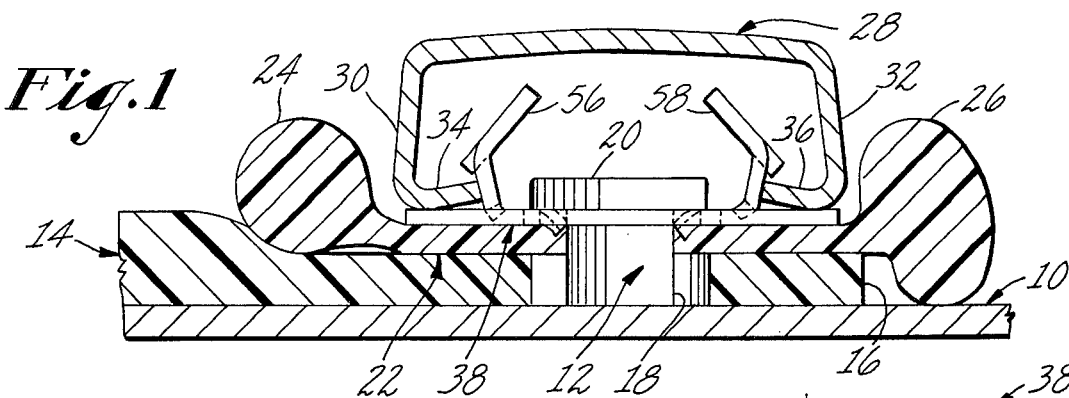
FIG. 1 is a sectional elevational view showing a panel having a trim strip attached thereto and employing the invention.
Figure 2:
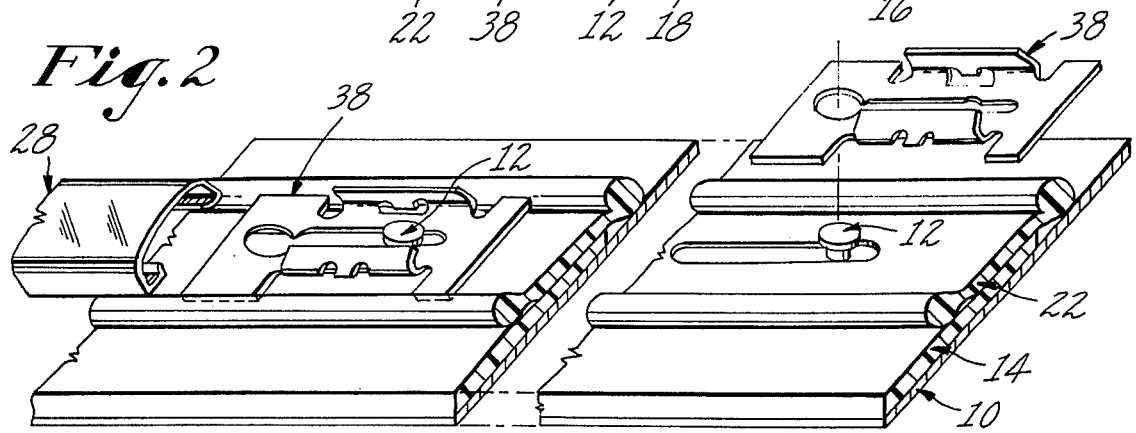
FIG. 2 is a perspective plan view showing details of the structure of FIG. 1.

Referring now to the drawing and in particular to FIGS. 1 and 2, there is shown a panel 10 which may be an automobile roof panel having a plurality of stud fasteners 12 welded thereto. The stud fasteners 12 are aligned along the panel 10 at that point where a flexible sheet of vinyl material 14 terminates. The sheet 14 is adhesively secured to the panel 10 over its area and openings are formed in the sheet to receive the stud fasteners 12, the sheet being trimmed to form an edge 16 which is subsequently being hidden by the assembly to be described.

Each of the stud fasteners 12 comprises a shank portion 18 and a button head 20, the button head being of greater diameter than the shank.

In order to provide a smooth transition from the panel 10 to the vinyl sheet 14, an elongated flexible strip 22 of vinyl material, sometimes referred to as vinyl lace in the industry, is located adjacent the edge 16 of the sheet 14.

In the present structure, the strip 22 has a pair of beads 24 and 26 running along opposite edges of the strip and is provided with openings for receiving the button head 20 of a stud 12. The openings in the strip 22 and the sheet 14 may be somewhat larger than the shank 18 of stud 12 to allow the materials to lie flat against the panel 10 without bulging. This portion of the strip 22 and the sheet 14 are hidden from sight when the assembly is completed.

As shown in FIGS. 1 and 2, a U-shaped trim molding 28 is provided between the beads 24 and 26 to finish the assembly by providing the ornamental transition from the panel 10 to the flexible sheet 14. The molding 28 comprises a pair of legs 30 and 32 each having an inwardly extending portion 34, 36 respectively.

Referring now to FIGS. 2 through 5, the assembly of the strip 22 and U-shaped trim molding 28 onto the plurality of stud fasteners 12 is accomplished by employing a novel one-piece clip 38 which serves to attach the molding 28 onto the panel 10 while aligning the strip 22 relative to the molding. The clip 38 is manufactured from a sheet of resilient material, such as spring steel, and in the present embodiment is approximately .015 inch in thickness.

Figure 3:
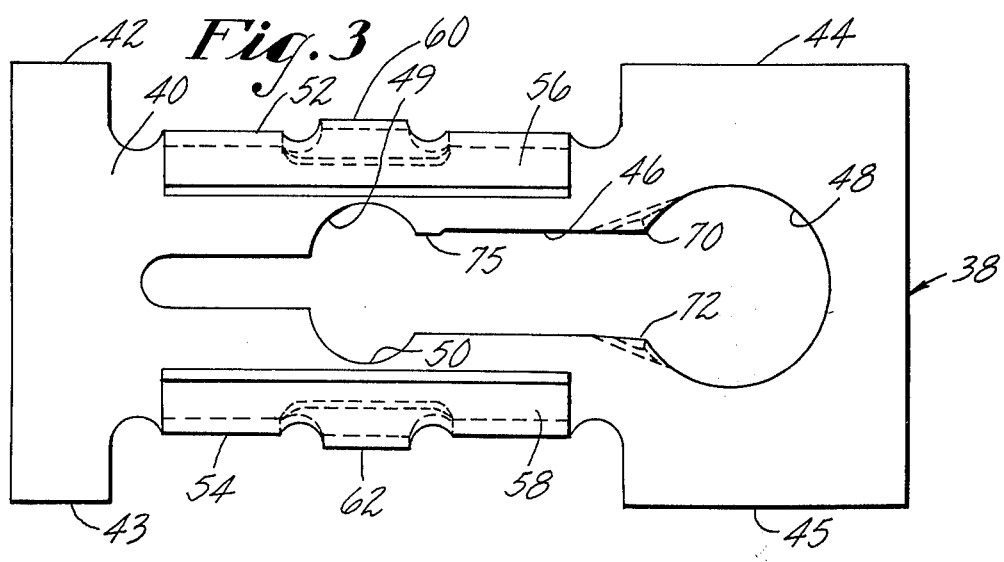
FIG. 3 is a plan view showing details of the clip of FIGS. 1 and 2.
Figure 4:
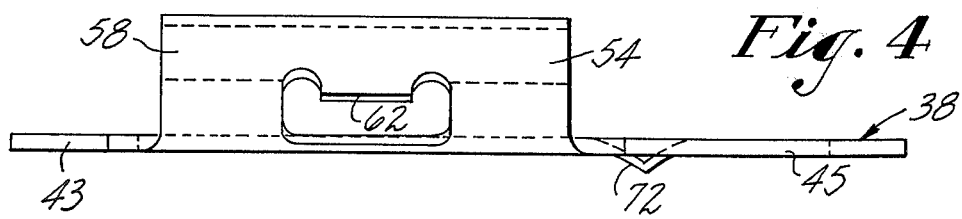
FIG. 4 is a side elevational view showing further details of the clip of FIG. 3.
Figure 5:
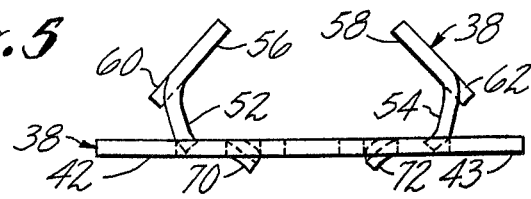
FIG. 5 is an end elevational view showing the clip of FIGS. 3 and 4.

Referring to FIGS. 3, 4 and 5, the clip 38 comprises a body 40 of substantially planar configuration having oppositely extending feet 42, 43 and 44, 45 projecting outwardly from the body portion. The feet 42, 43 and 44, 45 extend from the body 40 a distance substantially the width of the strip 22 between the beads 24 and 28, and are symmetrical with the center of the clip body 40. A slotted opening 46 extends from near one end of the body 40 toward the opposite end, and terminates at the one end in a circular opening 48 of slightly larger diameter than the button head 20 of the stud 12. The slotted opening 46 is of slightly larger width than the diameter of the shank 18 but is smaller than the diameter of the head 20 of the stud 12. Near the midportion of the clip body 40 a relief portion 49 and 50 is formed in the sides of the slotted opening 46 to provide for slight lateral movement of the clip 38 when mounted on the stud, as shown in FIGS. 1 and 2.

The clip 38 further comprises a pair of upstanding legs 52 and 54 each having a flange 56 and 58 respectively directed inwardly one toward the other. Each of the flanges 56 and 58 extends outwardly at its lower end to form a tab 60 and 62 respectively which is useful in retaining the trim molding 28 onto the clip 38 as will be explained below.

Referring to FIG. 2, in employing the clip 28 in the assembly, the flexible sheet 14 is fastened to the panel 10 by cement or other means, and the studs 12 protrude through the edge of the vinyl sheet prior to the assembly operation. The strip 22 is stretched along the plurality of studs 12 and the clips 38 are assembled to the buttons by inserting the head 20 through the circular opening 48 and moving the clip along the strip 22 until the shank 18 of the stud is received adjacent the relief portions 49, 50 of the slotted opening 46. In assembling the clip, the feet 42, 43, and 44, 45 serve to position the strip 22 under the clip 38 and the clip and strip are substantially centered onto the stud 12 in the final assembly. The height of the stud 12 is such that the strip 22 and the sheet 14 are slightly compressed when the button head 20 is received onto the body 40 of the clip. A pair of tangs 70, 72 on the clip 38 serve to lead the clip under button head 20 for ease of assembly. Additionally, a tab 75 extends into the slotted opening 46 to provide a restriction in the opening of lesser dimension than the diameter of the shank 18 of the stud 12, thereby locking the stud in place, when received in the relieved portions 49, 50.

After the strip 22 has been assembled onto the panel 10 with the clips 38 in place, the U-shaped molding 28 is assembled over the flanges 56 and 58 of the legs 52, 54 and the inwardly directed leg portions 34 and 36 of the molding 28 are received under the tabs 60 and 62. The tabs 60 and 62 thus inhibit removal of the molding 28 when assembled, as is shown in FIG. 1.

During assembly of the molding 28 onto the clip 38 should there be a slight variance in alignment of the studs 12, the relieved portion 49 and 50 in the slotted opening 46 allows slight lateral movement of the clip to allow for this variation, as well as variation in manufacture of the U-shaped trim molding.

While the clip 38 has been shown used in conjunction with a strip having beads located at each edge of the strip, the clip may also be used where a vinyl strip has but one edge beaded or in conjunction with the vinyl strip where other forms of protruding edges are provided for decorative purposes on the strip.

Having thus described my invention and what I claim as new and desire to secure as Letters Patent of the United States is:

1. A one-piece clip for assembling a U-shaped trim molding and an elongated flexible strip having beaded edge portions onto a panel surface provided with button headed stud fasteners, wherein the trim molding is located between the beaded edges of the flexible strip, comprising:

a body portion having disposed adjacent each end thereof a pair of oppositely directed feet lying in a plane parallel with the surface of the strip and extending outwardly from said body portion to a position contiguous with the bead at each edge of the strip to thereby substantially center said body portion on the strip;

resilient means for engaging the button head of said stud fastener to retain said clip and the strip adjacent the surface having the studs provided thereon; and resilient means extending into said U-shaped trim molding and engaging the molding to retain and align the molding between the beaded edges of the flexible strip.

2. The one-piece clip of claim 1 which is fabricated from a resilient metallic material.

3. The clip of claim 1 wherein said means for engaging the button head of the stud comprises a surface of said clip body perpendicular to the axis of the stud and having a circular opening formed therein near one end of the clip body, said opening being of greater diameter than the button head, a slotted opening extending from said one end of the clip body to near the center thereof, said slotted opening being of slightly greater width than the shank diameter of the button headed stud, and said slotted opening having a relieved portion formed near the center of the clip body to provide slight side to side movement of said clip on said stud when the stud shank is recieved in the relieved portion of said slotted opening.

4. The clip of claim 3 wherein said circular opening and said slot are symmetrically disposed along the longitudinal centerline of said clip body.

5. The clip of claim 1 wherein said means engaging the trim molding comprises a pair of flanges extending upwardly into the U-shaped trim molding adjacent the edges of the molding, and a pair of downwardly extending tabs, one on each of said flanges for contacting the edges of the U-shaped molding to inhibit upward movement of the molding and resultant removal of the molding from the clip.

6. The clip of claim 5 wherein said upwardly extending flanges are disposed symmetrically about the longitudinal centerline of said clip body.

7. The clip of claim 5 wherein said means for engaging the button head of the studs comprises a surface of said clip body perpendicular to the axis of the stud and having a circular opening formed therein near one end of the clip body, said opening being of greater diameter than the button head, a slotted opening extending from said one end of the clip body to near the center thereof, said slotted opening being of slightly greater width than the shank diameter of the button headed stud, and said slotted opening having a relieved portion formed near the center of the clip body to provide slight side to side movement of said clip on said stud when the stud shank is received in the relieved portion of said slotted opening.

8. The clip of claim 7 wherein said opposed feet are symmetrically disposed about the longitudinal centerline of said clip body.

9. The clip of claim 8 wherein said circular opening and said slot are symmetrically disposed along the longitudinal centerline of said clip body.

10. The clip of claim 9 wherein said upwardly extending flanges are disposed symmetrically about the longitudinal centerline of said clip body.

11. The one piece clip of claim 10 which is fabricated from a resilient metallic material.

12. The clip of claim 1 wherein said opposed feet are symmetrically disposed about the longitudinal centerline of said clip body.

* * * * *